United States Patent [19]

Ziemann

[11] 4,039,785
[45] Aug. 2, 1977

[54] COMPUTER CONTROLLED ARTICLE HANDLING SYSTEM

[75] Inventor: Erich T. Ziemann, Madison, Wis.

[73] Assignee: American Chain & Cable Company, Inc., Bridgeport, Conn.

[21] Appl. No.: 651,965

[22] Filed: Jan. 23, 1976

[51] Int. Cl.² .......................... B25J 9/00; B25J 5/04; B65G 61/00; B66F 9/24
[52] U.S. Cl. ................................. 235/151; 209/72; 209/75; 221/9; 221/129; 340/173 SP; 364/290
[58] Field of Search .............. 209/72, 75; 221/9, 129; 222/76; 235/151, 151.1; 340/173 SP, 172.5

[56] References Cited

U.S. PATENT DOCUMENTS

| | | | |
|---|---|---|---|
| 3,245,051 | 4/1966 | Robb | 340/173 SP |
| 3,383,011 | 5/1968 | Reed et al. | 221/129 X |
| 3,624,792 | 11/1971 | Lipfert | 221/129 |

Primary Examiner—R. Stephen Dildine, Jr.
Attorney, Agent, or Firm—Barnes, Kisselle, Raisch & Choate

[57] ABSTRACT

An article handling system including means for moving articles from one position to another and including computer means for controlling a plurality of functions of said article handling means including unalterable memory devices for controlling some of the functions and manually operable mechanical selectively programmable memory devices for controlling other of the functions.

12 Claims, 6 Drawing Figures

COMPUTER CONTROLLED ARTICLE HANDLING SYSTEM

This invention relates to article handling systems such as computer controlled storage and retrieval crane systems.

BACKGROUND OF THE INVENTION

In article handling systems such as storage and retrieval crane stacking systems, it has become common to store and retrieve articles in response to a command from a control center such as a computer. For example, in a crane type system, a crane is movable horizontally along a track between two rows of storage racks, each rack having vertical and horizontal storage spaces. The crane is provided with a table movable laterally to and from the storage spaces as well as vertically.

When a computer is utilized to control the crane, the computer is programmed to properly deliver and pick up articles from the storage spaces. More specifically, the computer controls the movement of the crane horizontally and the table vertically and horizontally on the crane. However, in setting up the system in the field and in use thereof, it is often desirable to change the program to accommodate changes in dimensions occurring during erection due to wear. In making such changes, the services of a highly skilled electronically trained programmer are required.

More recently, to avoid the problem of festooning large numbers of wires to the central computer, it has become desirable to utilize a computer on board the crane using memory modules of the read-only type. Such memory modules are either erasable or non-erasable. Where they are non-erasable, in order to change the memory, they must be replaced by a newly programmed memory. Where they are erasable, it is necessary to completely erase the memory and then re-program the device with the corrected information. In any event, special apparatus and skill is required.

It is an object of the present invention to provide an article handling system such as a storage and retrieval crane system utilizing a re-programmable memory which does not require skilled electronically trained persons; which is manually operated to erase part or all and re-program selectively a function; which utilizes a compact, easily manufactured module.

SUMMARY OF THE INVENTION

In accordance with the invention, the article handling system includes computer means for controlling a plurality of functions of the article handling means including unalterable memory devices for controlling some of said functions and manually operable mechanical selectively programmable memory devices for controlling other of the functions.

DESCRIPTION

Figure 1:
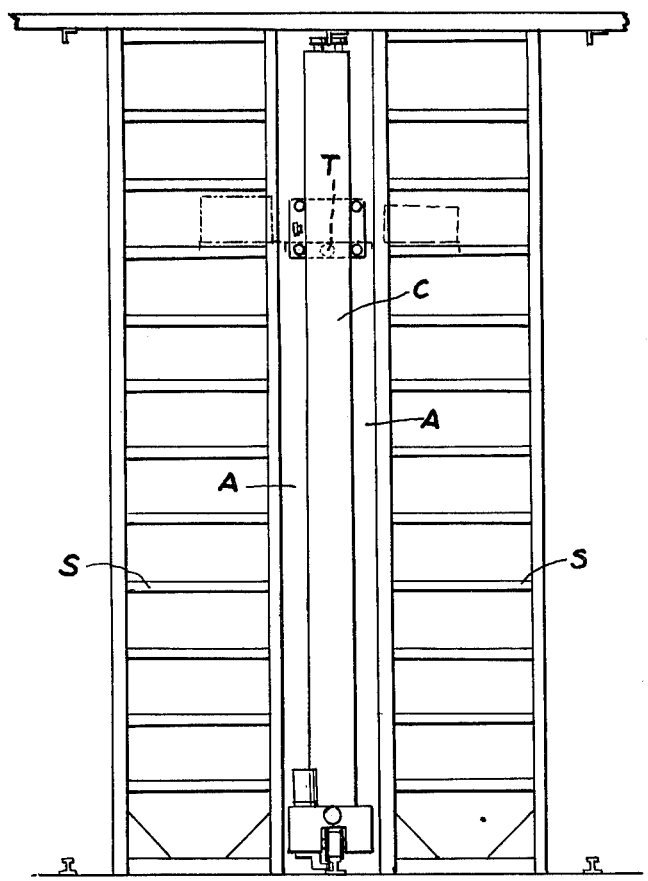
FIG. 1 is an elevational view of a storage and retrieval crane system of the type with which the invention may be used.

Referring to FIG. 1, the invention may be utilized in connection with a crane system wherein a crane C is movable along a horizontal track between two rows of storage stacks S. The crane includes a table T movable vertically thereon to any one of the storage spaces A and movable horizontally for delivering or removing an article or pallet to and from the storage spaces A.

The crane includes a drive motor for moving the crane horizontally and a motor for moving the table T vertically. In addition, the crane includes a drive mechanism for driving the table T laterally into and out of the spaces A, all in accordance with well-known construction.

In accordance with the invention, a central computer delivers signals to a computer on board the crane to provide the principal signals for moving the crane to and from a pickup station adjacent the ends of the stacks or a delivery station adjacent the ends of the stacks and the storage spaces A.

Figure 2:
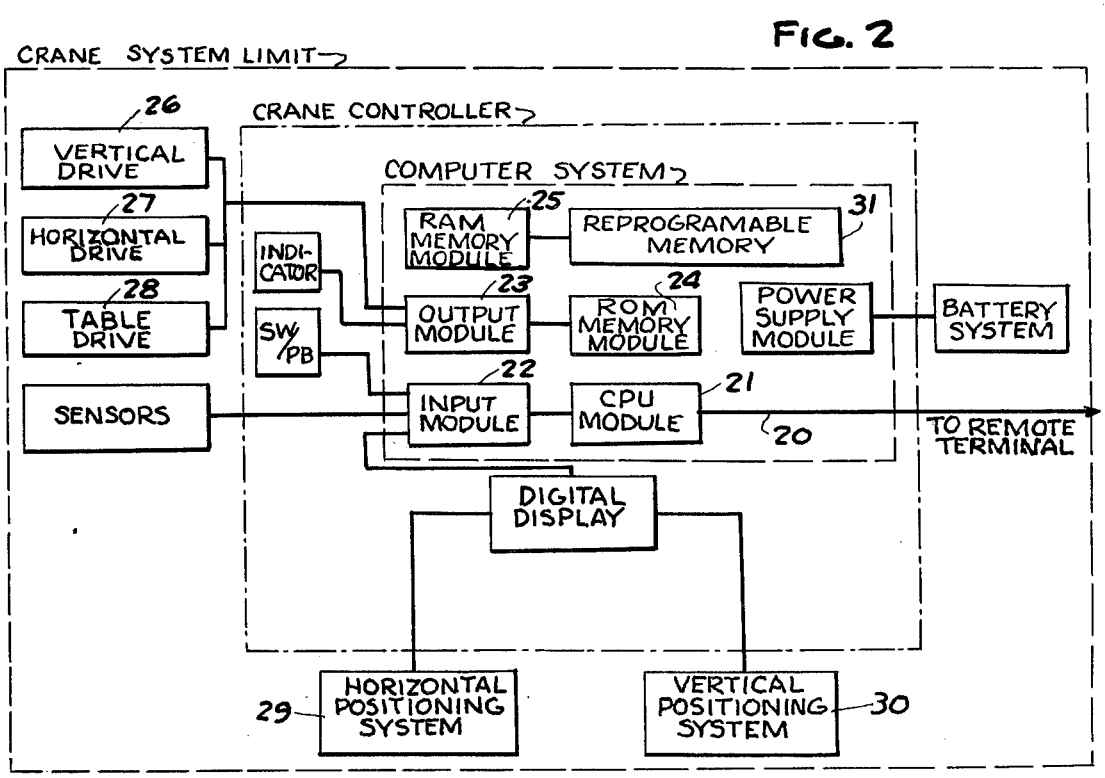
FIG. 2 is a block diagram of a portion of the system embodying the invention.

Referring to FIG. 2, which is a block diagram of the crane control system and particularly of the computer, the line 20 connects the crane computer to the remote main computer and provides the master control signals which through the various modules 21, 22, 23 and memory modules 24, 25 control the vertical drive 26, horizontal drive 27, and table drive 28. Horizontal and vertical encoders 29, 30 provide positioning signals to the system.

In accordance with the invention, a reprogrammable memory 31 is provided in the system in order to permit programming in the field by persons who are not necessarily trained electronically. The reprogrammable memory 31 is a manually operable mechanically selectively programmable memory sometimes herein referred to as MOMSEL PROM.

Figure 3:
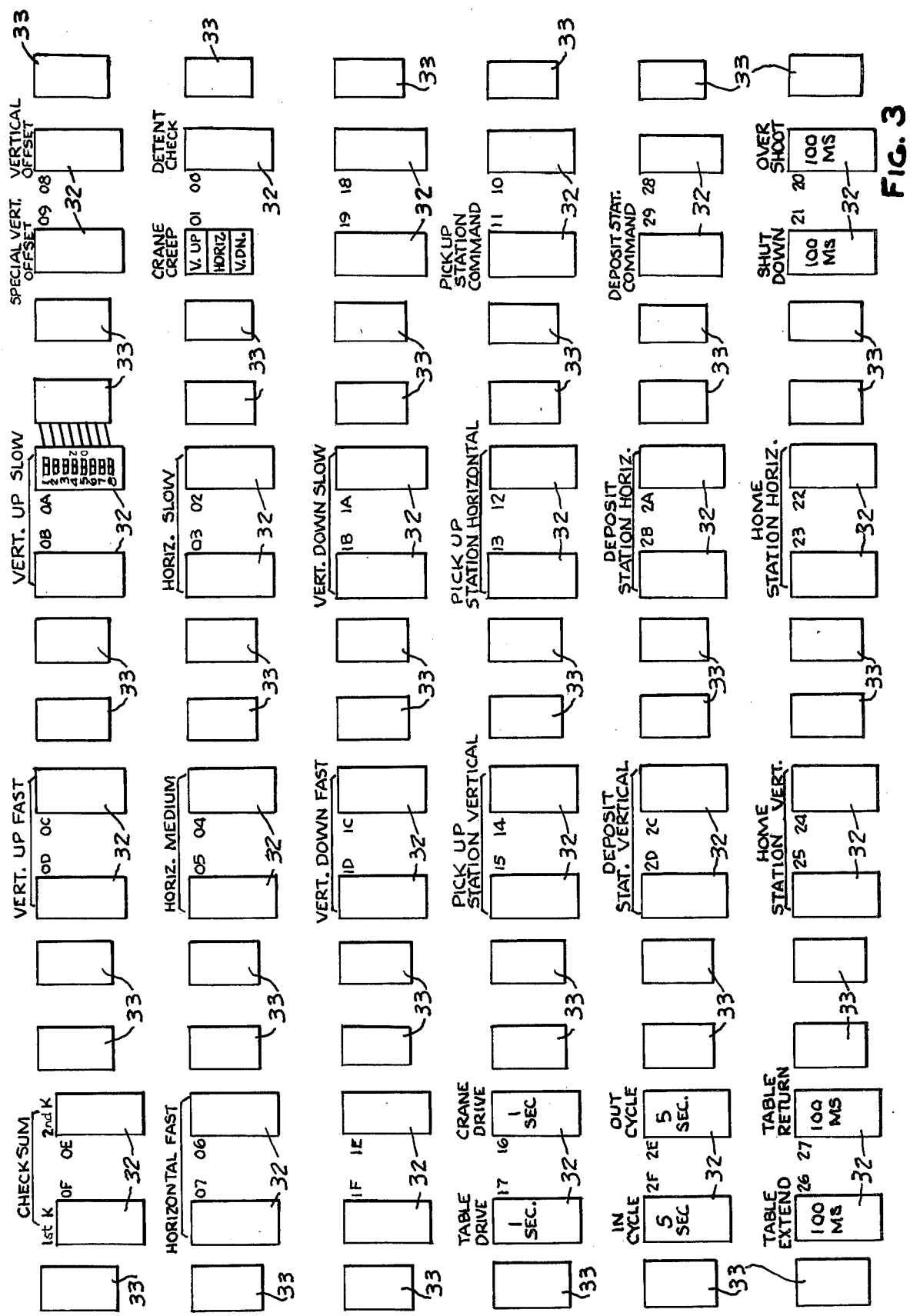
FIG. 3 is a block diagram showing the array of the reprogrammable memory devices on a circuit board.
Figures 4, 5, 6:
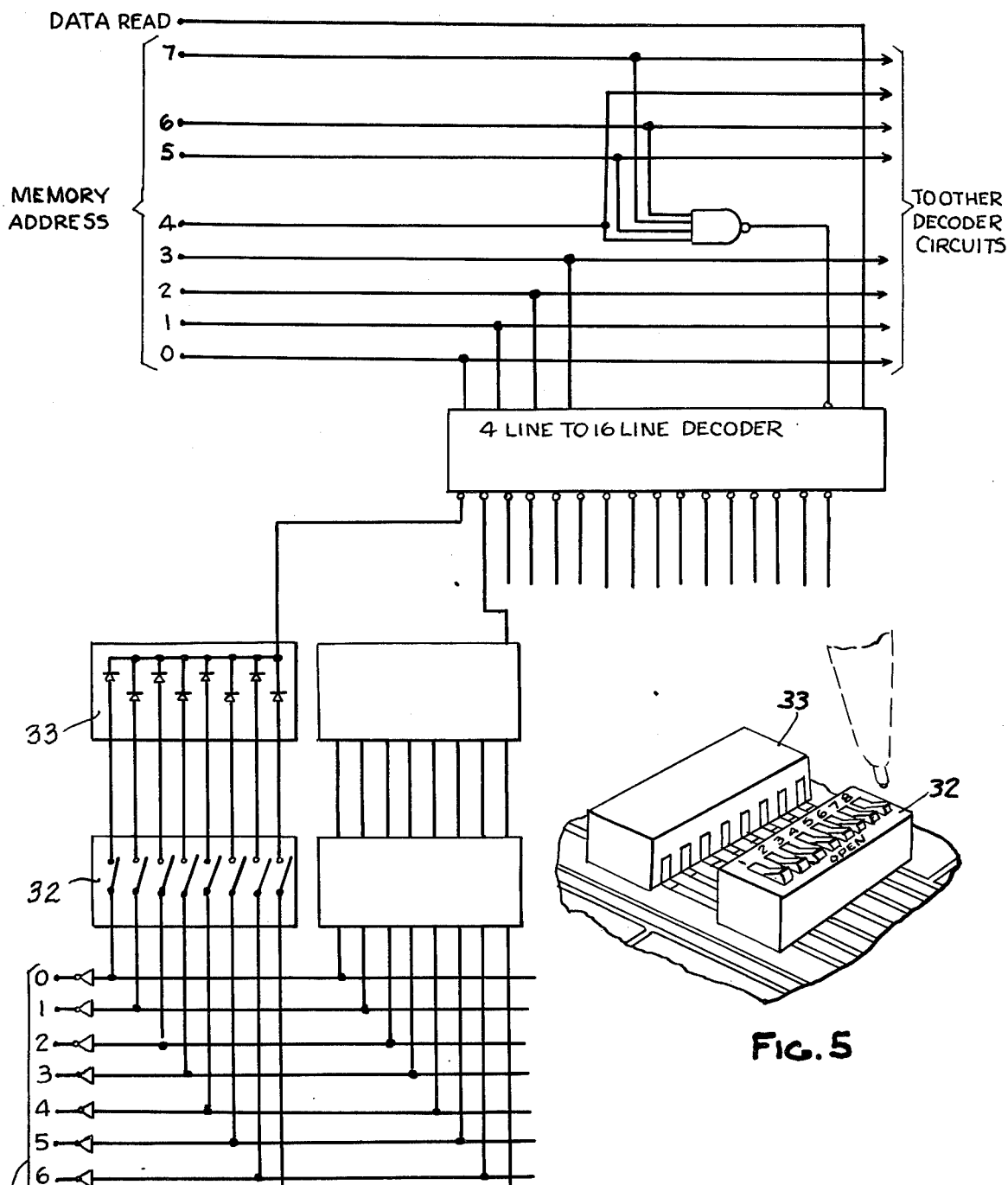
FIG. 4 is a logic diagram of a portion of the reprogrammable memory.
FIG. 5 is a fragmentary perspective view of a typical switch utilized in the memory.
FIG. 6 is a sectional view through the switch.

The reprogrammable memory 31 may comprise one or more circuit boards as shown in FIG. 3, each of which includes pairs of switch modules 32 and diode modules 33. As shown in FIGS. 5 and 6, each switch module 32 comprises a plurality of small manually operated switches. Each switch includes a movable member 34 having a contact 35 that moves to make and break a connection between wires 36, 37.

As shown in the logic diagram in FIG. 4, each switch of each switch module 32 is connected in series with a unidirectional circuit control diode 38 of the diode module 33, the diodes of each module 33 being connected in parallel. The parallel connected diodes, in turn, extend to the memory addressing lines from the crane computer. Only typical functions are shown in FIG. 4, it being understood that each pair of switch module 32 and diode module 33 is provided for each function which is to be controlled.

When it is desired to change a function of the system due to installation errors, variations in topography, or wear of the equipment, one or more of the switches in each module 32 is actuated manually to change the program as to the function controlled by that module. Since the module does not require erasure of the entire program, it is possible through tables supplied with the equipment to instruct a person who is not electronically trained in the field to make the change in the program.

Thus, in connection with a crane system, the modules can be utilized as follows:

MOMSEL PROM PANEL PROGRAMMING — Each module 32 has its switches numbered with digits 1 thru 8 and has labeling to show the OFF (or OPEN) position. When a switch is ON (CLOSED), it forces a binary '1' in the particular bit position within the byte (8 bits or one switch bank). Bit 8 is the Most Significant Bit (MSB). All variables are encoded in the binary format. On the circuit board are identifying binary numbers, 00 thru 2F, located immediately adjacent to the switch bank. These are used to locate the proper switch bank. When changing switch settings, a pointed object is used to be sure the transition from one state to the other is positive. Among the functions which can be controlled by pairs of switch modules and diodes are the following:

VERTICAL OFFSET (location 08) — The vertical offset is the distance measured in hexidecimally encoded vertical increments required to raise or lower the crane table when it is respectively storing or retrieving a load within a storage rack.

SHUTDOWN (location 21) — This switch setting selects the amount of time that the crane controlled shall remain on battery power after failure of the AC input power.

OVERSHOOT (location 20) — This switch setting selects the amount of waiting time after reaching a target location before checking to see if the crane has overshot the target address.

TABLE DRIVE FAIL (location 17) — This switch setting selects the amount of time that the crane shall wait before generating a Crane Error status. The start of this delay occurs at the beginning of an extend or retract command. The delay is terminated when the table Fully Extended or Table Centered signals are received by the controller. No crane error shall be generated provided they have been received within the selected delay time.

CRANE DRIVE FAIL (location 16) — This switch setting selects the amount of time that non-movement of the crane is allowed without the generation of a crane error status. This delay is only effective when movement of the crane is required (i.e. commanded address does not equal present position).

TABLE EXTEND DELAY (location 27) — This switch setting selects the amount of time that the crane shall wait after receiving the Table Fully Extended contact. After this time delay has expired, the crane shall raise or lower the table as required by the operation (Retrieve or Store).

TABLE RETRACT DELAY (location 26) — This switch setting selects the amount of time that the crane shall wait after receiving the Table Centered Contact, during a Table Retract operation.

IN CYCLE (location 2F) — This switch setting selects the maximum amount of time that the crane can be In-Cycle. If this timer expires, a crane error status is generated and the current cycle is terminated provided the crane is not in the process of raising or lowering the crane table.

OUT CYCLE (location 2E) — This switch setting selects the maximum amount of time that the crane can be Out-of-Cycle. If this timer expires, the controller is cleared and the crane status is automatically transmitted to the remote terminal.

HOME STATION ADDRESS (location 22, 23, 24, 25) — The home station is a user defined location which can be programmed into the controlled to provide automatic positioning of the crane at a known location upon command.

HOME STATION-HORIZONTAL (location 22, 23) — The lower byte of the horizontal home address is contained in switch bank No. 22 while the upper byte is contained in switch bank No. 23.

HOME STATION-VERTICAL (location 24, 25) — The lower byte of the vertical home address is contained in switch bank No. 24 while the upper byte is contained in switch bank No. 25.

DEPOSIT STATION (location 29, 2A, 2B, 2C, 2D) — The deposit station is a user defined location where all outgoing loads from a storage system are placed.

DEPOSIT STATION-HORIZONTAL (location 2A, 2B) — The lower byte of the horizontal deposit address is contained in switch bank No. 2A while the upper byte is contained in switch bank No. 2B.

DEPOSIT STATION-VERTICAL (location 2C, 2D) — The lower byte of the vertical deposit address is contained in switch bank No. 2C while the upper byte is contained in switch bank No. 2D.

PICKUP STATION (locations 12, 13, 14, 15) — The pickup station is a user defined location where all incoming loads to the storage system are placed.

PICKUP STATION-HORIZONTAL (location 12, 13) — The lower byte of the horizontal deposit address is contained in one switch bank No. 12 while the upper byte is contained in another switch bank No. 13.

PICKUP STATION-VERTICAL (location 14, 15) — The lower byte of the vertical deposit address is contained in switch bank No. 14 while the upper byte is contained in switch bank No. 15.

CRANE DRIVE SWITCH POINTS — The crane drives have either three or four speeds; the points at which each speed is activated or deactivated is determined by the switch point settings. Points that are set far apart will result in loss of total cycle efficiency since the average drive speed of the crane will be lower than if optimum points are selected. Points that are set too close together will result in improper crane operation (overdrive) and possibly damage to the drive system. The usual indication of the overdrive condition will be the generation of the crane error status signals. As a general rule, it is desirable to remain in the highest speed possible for as long as possible. It is also necessary to adjust switch points under worst case conditions. These include a full load table for horizontal and vertical-down adjustments and an empty table for vertical-up adjustments. It may also be necessary to readjust the switch points on a periodic basis to compensate for drive and brake wear. Initial settings can be determined by consulting the mechanical designer and the appropriate acceleration curves for the particular crane.

CRANE CREEP SPEED — The creep speed switch or dropout points are all contained on one switch bank located at No. 01. The horizontal direction and the respective vertical directions have two selectable bits so that any one of four dropout points may be selected for each. These points include zero increments (exact address) one, two and three increments. The Vertical-up creep point can be selected by bits 2 and 1. The Horizontal creep joint can be selected by bits 4 and 3. The Vertical-Down creep point is selected by bits 6 and 5. In such a case, bits 7 and 8 are not used.

VERTICAL UP SLOW (location 0A, 0B) — The lower byte of the Vertical, up direction, slow speed switch point is contained in switch bank 0A while the upper byte is contained in switch bank 0B.

VERTICAL UP FAST (location OC, OD) — The lower byte of the Vertical-up direction fast speed switch point is contained in switch bank No. OC while the upper byte is contained in switch bank OD.

HORIZONTAL SLOW (location 02, 03) — The lower byte of the Horizontal direction, slow speed switch point is contained in switch bank No. 2 while the upper byte is contained in switch bank 03.

HORIZONTAL MEDIUM (location 04, 05) — The lower byte of the Horizontal direction, medium speed switch point is contained in switch bank 04 while the upper byte is contained in switch bank 05.

HORIZONTAL FAST (location 06, 07) — The lower byte of the Horizontal direction, fast speed switch point is contained in switch bank 06 while the upper byte is contained in switch bank 07.

VERTICAL DOWN SLOW (location 1A, 1B) — The lower byte of the vertical down direction, slow speed switch point is contained in switch bank No. 1A while the upper byte is contained in switch bank 1B.

VERTICAL DOWN FAST (location 1C, 1D) — The lower byte of the vertical down direction, fast speed switch point is contained in switch bank No. 1C while the upper byte is contained in switch bank No. 1D.

A typical table of the type commonly known as an octal-decimal integer conversion table used to provide instruction to operating personnel of the manner and direction in which changes should be made for each of the adjustments.

I claim:

1. In an article handling system including means for moving articles from one position to another, the combination comprising
computer means for controlling a plurality of functions of said article handling means including
unalterable memory devices for controlling some of said functions,
and manually operable mechanical selectively programmable memory devices for controlling other of said functions.

2. The combination set forth in claim 1 wherein said manually operable memory devices comprise for each said function a plurality of unidirectional circuit control devices connected in parallel and a manually operated switch associated with each said unidirectional circuit control device.

3. The combination set forth in claim 2 wherein said unidirectional control devices comprise diodes.

4. The combination set forth in claim 1 wherein said manually operable memory devices comprise a plurality of modules,
each said module including an array of manually operable switches,
and a diode individual to each said switch and connected in series therewith,
said diodes being connected in parallel to one another.

5. The combination set forth in claim 1 wherein said unalterable memory devices comprise programmable read only memories.

6. The combination set forth in claim 5 wherein said mechanically operable memory devices are mounted on a movable portion of said system.

7. A storage and retrieval crane storage system including a crane movable between rows of racks and having a table thereon for moving an article vertically and horizontally relative to storage spaces in said racks, the combination comprising
computer means for controlling a plurality of functions of said crane including
unalterable memory devices for controlling some of said functions,
and manually operable mechanical selectively programmable memory devices for controlling other of said functions.

8. The combination set forth in claim 7 wherein said manually operable memory devices comprise for each said function a plurality of unidirectional circuit control devices connected in parallel and a manually operated switch associated with each of said unidirectional circuit control device.

9. The combination set forth in claim 8 wherein said unidirectional control devices comprise diodes.

10. The combination set forth in claim 7 wherein said manually operable memory devices comprise a plurality of modules,
each said module including an array of switches,
and diodes individual to each said switch and connected in series therewith,
said diodes being connected in parallel to one another.

11. The combination set forth in claim 7 wherein said unalterable memory devices comprise programmable read only memories.

12. The combination set forth in claim 11 wherein said manually operable memory devices are mounted on said crane of said system.

* * * * *